United States Patent
Park et al.

[19]

[11] Patent Number: 5,949,022

[45] Date of Patent: Sep. 7, 1999

[54] SEALING STRUCTURE FOR A SINGLE-BODIED END CAP OF SPLICE CLOSURE FOR OPTICAL CABLES

[75] Inventors: Young Ki Park; Yun-Won Chang, both of Yousung-Ku, Rep. of Korea

[73] Assignee: LG Chemical Ltd., Seoul, Rep. of Korea

[21] Appl. No.: 08/617,084

[22] Filed: Mar. 18, 1996

[51] Int. Cl.[6] ................................................. H02G 15/04
[52] U.S. Cl. .......................................... 174/77 R; 174/93
[58] Field of Search ................................. 174/77 R, 93; 292/256.67, 256.71, 256.73

[56] References Cited

U.S. PATENT DOCUMENTS

| | | | |
|---|---|---|---|
| 2,919,420 | 12/1959 | Snodgrass et al. | 439/29 X |
| 3,055,972 | 9/1962 | Peterson | 174/151 X |
| 3,555,171 | 1/1971 | Larson | 174/138 F X |
| 3,617,614 | 11/1971 | Henry | 174/77 R |
| 3,678,178 | 7/1972 | Hubbauer et al. | 174/152 R X |
| 4,103,911 | 8/1978 | Giebel et al. | 277/210 |
| 4,538,021 | 8/1985 | Williamson, Jr. | 174/92 |
| 5,343,103 | 8/1994 | Aoki et al. | 310/87 X |
| 5,502,282 | 3/1996 | Kunze | 174/93 |

*Primary Examiner*—Kristine L. Kincaid
*Assistant Examiner*—Chau N. Nguyen
*Attorney, Agent, or Firm*—Birch, Stewart, Kolasch & Birch, LLP

[57] ABSTRACT

A cable splice closure assembly includes an end cap body having at least one cable passage hole therein for the passage of a cable therethrough, the end cap body defining a seal zone for retaining a sealing material and a thread zone, and a screw plug having a cable passage hole therein for the passage of a cable therethrough, the screw plug being adapted for mating engagement with the thread zone of the end cap body.

5 Claims, 2 Drawing Sheets

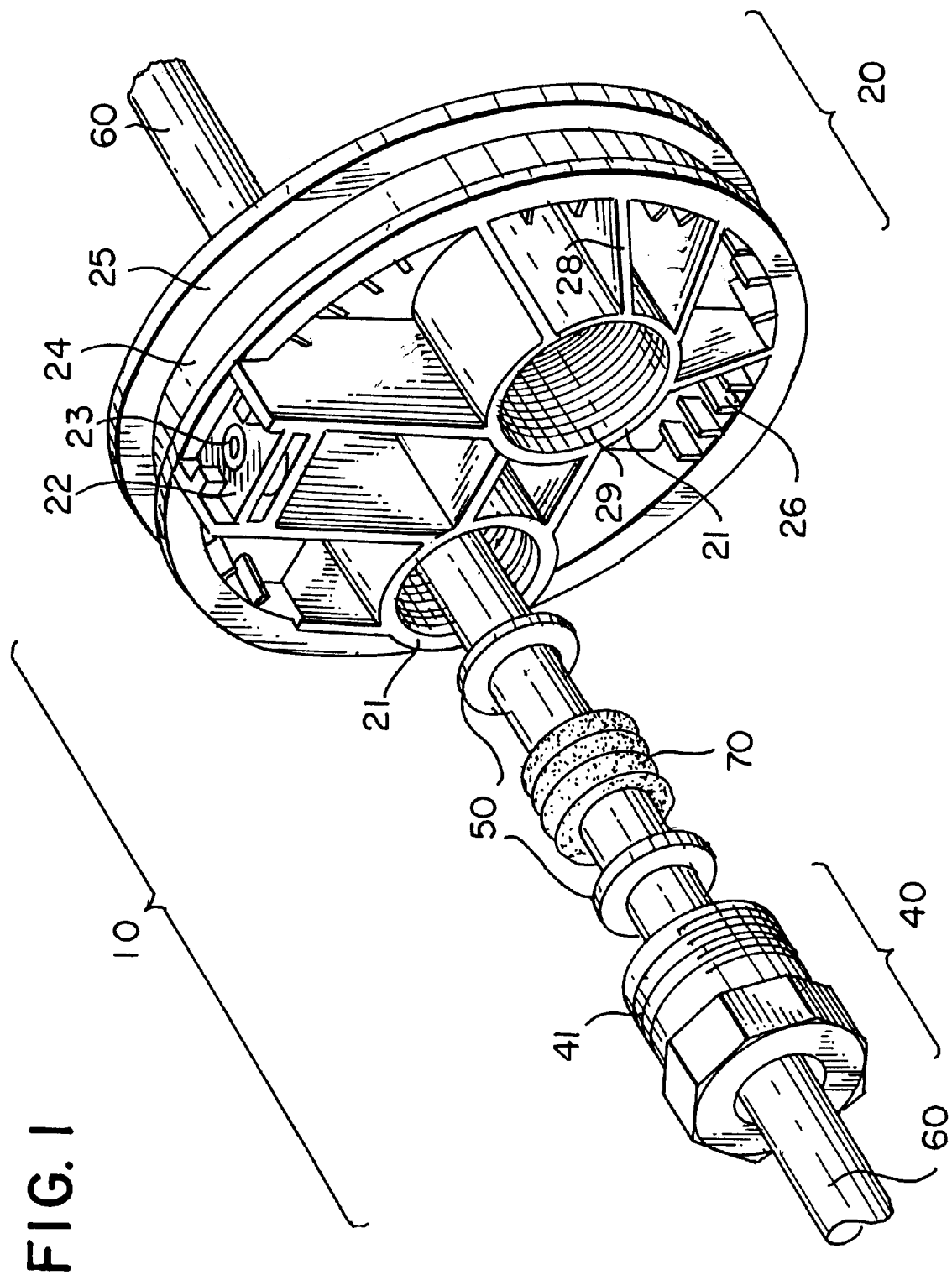

SEALING STRUCTURE FOR A SINGLE-BODIED END CAP OF SPLICE CLOSURE FOR OPTICAL CABLES

BACKGROUND OF THE INVENTION

FIELD OF THE INVENTION

The present invention relates to a gas-tight closure assembly for the protection of spliced optical fiber cables, and more particularly, to an end cap closure which provides for sealing the cable entry port. The end cap is made of a single piece construction for the purpose of achieving an easier installation which is protected from moisture ingress into the closure.

Where telecommunication cables are spliced and connected together, a protective cover known as a splice closure is utilized to prevent the splice area from moisture ingress which is detrimental to the signal transmission performance of the cable. A conventional splice closure comprises a pair of cylindrical covers elongated with the cable axis and two caps having cable entry ports at the ends of the cover. Typically, as disclosed in U.S. Pat. Nos. 4,103,911 and 4,538,021, the end cap is composed of two or more members and during the assembly of the end cap, the openings for the cable entry are formed between members with mating faces. Ahead of the end cap assembly, a sticky sealing tape is applied between the mating faces and also the surface of the cable jacket is wound with the sealing tape. Then, with the use of a few bolts, the members are fastened together and the resultant force causes the flow of sealing tape to seal off any possible moisture path in the cable entry and the mating faces.

However, this type of end cap has some inherent problems in obtaining the desired gas tightness. For a secured sealing, the applied sealing tape should be evenly distributed between the mating faces and around the cable while the members are fastened together. However, this is not easily achieved because when fastening with bolts, usually four bolts, a non-uniform force is applied which causes non-uniform sealing and a flow of the sealing tape. Although to minimize this problem, a stepwise and alternating fastening is suggested, the installer must be educated accordingly or otherwise a high probability of gas leakage might result due to installation error. Further, where the number of entering cables is increased, improper sealing becomes more frequent. In this case, the end cap is composed of more members and thus more fasteners are needed for the assembly. As a result, the application of a sealing tape on the complicated mating faces and the fastening procedure is very time-consuming and thus an improper assembly is much more likely.

Another frequent gas leak in a multi-membered end cap is observed in the place where the continuity of the circumference of the end cap is not maintained. The circumference of the end cap is grooved radially and for the sealing between the cover and the end cap, an elastomeric gasket is employed. In the multi-membered end cap, at least two discontinuous lines are inevitably formed on the circumference due to the member mating where the sealing tape is contained. When the circumferential gasket is worked out during the cover assembly, the repulsive force of the gasket which gives a proper sealing is usually lost at the mating lines because the sealing tape containing the mating lines tends to be relaxed continuously under the force induced by the gasket.

Accordingly, there is a need for an advanced sealing mechanism to overcome the above problems of the multi-membered end cap assembly.

SUMMARY OF THE INVENTION

It is an object of the present invention to provide an advanced gas leak-free end cap system for an optical cable splice closure assembly wherein no fastening for the integration of end cap members is required and wherein no sealing along the end cap member mating surfaces is employed.

In order to solve the above-mentioned problems in the prior designed end caps which comprise two or more separate members required for fastening the assembly, the end cap of the present invention is made of a single member which can be easily manufactured through the injection molding process. This single member end cap inherently has no member mating face to be sealed nor fasteners used for the assembly. Especially for the cable entrance that the single member end cap must provide, the cable entry port is designed as a cylindrical chamber which is parallel to the cable axis. The cylindrical chamber has two zones; one is the sealing chamber where the sealing tape wound around cable is packed up and the other is a taped zone for receiving the screwed plug. The screwed plug is in the form of a typical bolt with a hex head but provided with a channel for receiving the cable. The plug can also be made by injection molding.

The assembly of the end cap of the present invention is quite a quick and easy process because the installation of the cable in the end cap comprises only inserting the spliced cable into the cylindrical chamber and tightening the screwed plug. The movement of the screwed plug into the cylindrical chamber during the tightening results in the flow of the sealing tape and the eventual sealing between the cable and the cylindrical chamber. The screwed plug is uniquely designed to achieve this sealing mechanism.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG 1 is a fragmentary perspective illustration of the end cap assembly structure or the present invention;

DESCRIPTION OF THE PREFERRED EMBODIMENTS

Figure 2A:
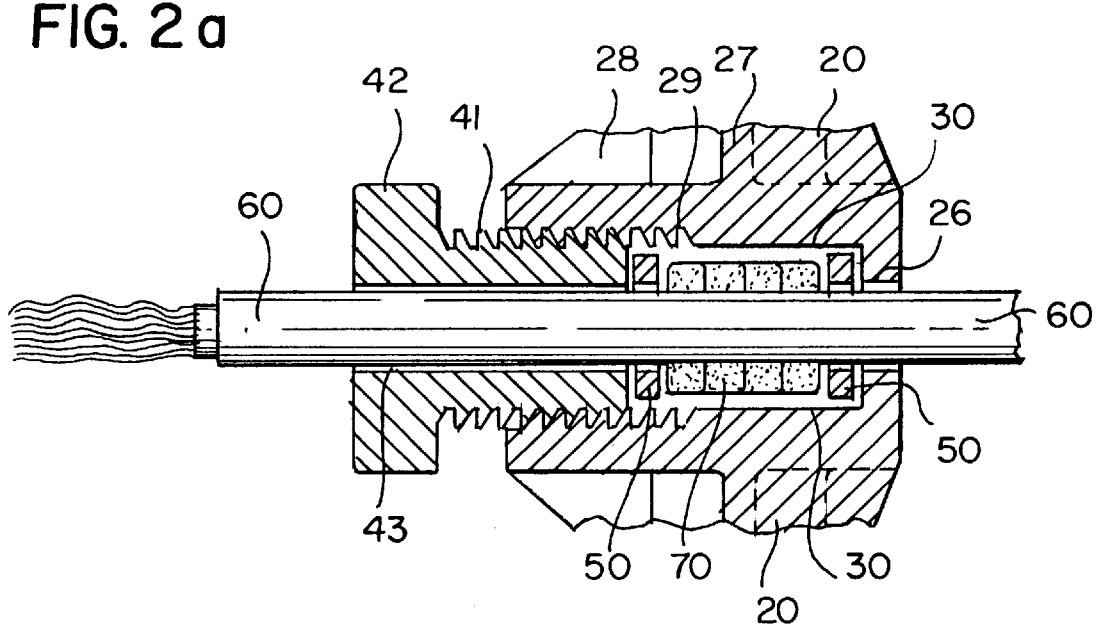
FIGS. 2(a) & 2(b) are cross-sectional illustration of the cable entry port of the end cap and related screw plug showing the sealing mechanism.

The overall layout of the preferred end cap assembly 10 is illustrated in FIG. 1. The end cap body 20 as designated here is composed on one piece and does not require assembly for the end cap embodiment. Therefore, the installation process is confined to the installation of the cable into the end cap. From this figure, the installation sequence is that the cable 60 is introduced into the cable entry port 21 first and then wrapped with the convolution of sealing tape 70 contained within the two washers 50 which eventually reach the interior of the closure with the engagement of the screw plug 40. Upon this arrangement, simply fastening the screw plug 40 into the cable entry port 21 leads to the complete integration of cable with the end cap and at the same time, an improved sealing between the cable 60 and the end cap 20 is achieved.

The end cap body 20 considered here is similar to the prior multi-member end caps having the form of a circular plate after assembly but one piece embodied in our design. In the single body of the end cap, bolt fasteners for the assembly of end cap need not be employed. Nor is it necessary to worry about the sealing problem in the mating faces which cannot be avoided in the multi-member end cap. The circumference ring 24 has a grooved flange 25 where the elastomeric gasket is placed for providing sealing between the end cap and the cover. The circumference ring 24 shown here is structurally reinforced by the gussets 28 extending on the plate of end cap. The holder 22 which has a metal nut 23 inserted therein is for connecting the steel bar which integrates the front and rear end caps. Although there are two cable entry ports 21 in the end cap illustrated here, the number of cable entry ports can be varied depending on the situation. When the number of cable entry ports needs to be increased to more than two, this single piece end cap has more design flexibility in that the area to be used for cable entry ports is more usable than the case of multi-member end caps wherein much of the area adjacent to the cable entry port is not available due to the fastener application.

Cable entry ports 21 provided herein are basically a cylindrical column having an axis corresponding to the cable axis. The outer column has ribs or gussets 28 extending from the end cap wall 27 to provide structural rigidity. The internal column of the cable passage has two distinguished zones; one is the seal zone 30 for the sealing material to be retained and the other is the threaded zone 29 for receiving the screw plug 40 which is described later. The outer end of cable entry column has the cable passage hole 26. In order that the cable passage hole can accept the various sizes of cable diameter, the hole is preferably blinded when the end cap is manufactured. The appropriate size of hole to meet the cable to be installed can be easily made through on-site drilling. For convenience, the center of the outer column is slightly dented to accept the drill bit.

Figure 2B:
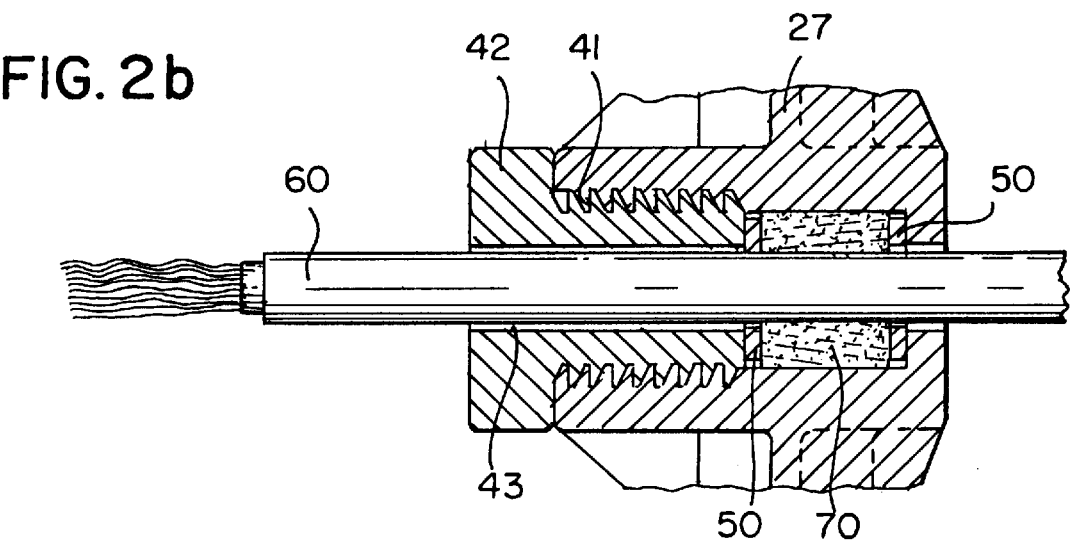
Figure 3:
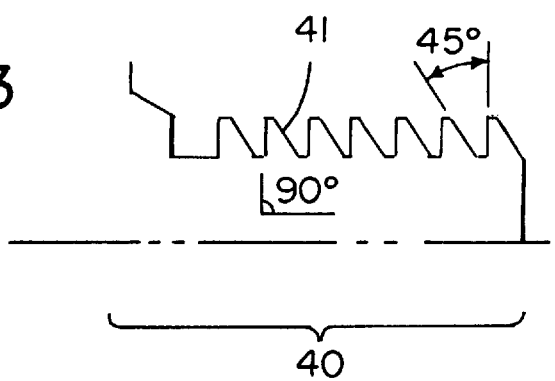
FIG. 3 is a reference view to illustrate the "buttress thread" of the screw plug.

For the seal between the cable 60 and the cable passage column of end cap 21, a screw plug 40 is utilized. This screwed plug is centrally hollowed 43 to provide for passage of the cable. FIGS. 2(a) & 2(b) are cross-sectional view of the screw lug and how the sealing between the cable and the cable entry port is effected. When the installation arrangement including the cable, the sealing tape 70 and washers 50 is made as shown in FIG. 2(a), the rotation of the head of the screw 42 moves the screw plug forward into the seal zone of the column and eventually the screw plug packs the sealing tape wrapped around the cable inside the chamber resulting in a complete sealing between the cable entry port and entering cable as shown in FIG. 2(b). The employment of washers 50 at the cable passage hole and at the end of the screw plug is recommended for ensuring that the pressurized sealing tape does not smear out. In the thread 41 for the plug and the cable column, any type of thread can be utilized. However, a buttress thread as illustrated in FIG. 3 is preferably recommended because with this type of thread, the assembly torque is low but the release torque is relatively high. This means that the assembly work can be made much easier and any possibility of the self-release of the plug can be ruled out.

The single bodied end cap with the new sealing mechanism mentioned above can be made through an injection molding process. Since severe mechanical force is not induced during the assembly utilizing our end cap system, areas of increased thickness for structural reinforcement are not necessary, which means that the end caps have a uniform thickness. One-eighth inch is recommended as the overall thickness and with this thickness, the end cap can be manufactured by the injection molding process which produces a consistent product with less warping and with high productivity due to its fast cycle time. The materials applied in the end cap and screw plug can be glass or mineral reinforced polypropylene, nylon, and polybutylterephtalate which are injection moldable. The sealing tape used herein is a conventional butyl rubber compound which has been already commercialized. It is noted here that the amount of sealing tape used in our system is relatively small and nevertheless still very effective in sealing.

The assembly operation of the end cap follows the following sequence.

1. Boring the cable passage hole with a suitable size for accommodating the cable to be installed therein;
2. Inserting spliced cable into the cable entry port;
3. Placing two washers and an end plug at an appropriate position of the cable at the outside of the cable entry port;
4. Positioning the two washers in the cable and wrapping a required amount of sealing tape around the cable between the two washers;
5. Inserting the cable wrapped with sealing tape and washers into the seal zone of the cable entry; and
6. Fasten tightly the screw plug against the end cap body with a wrench.

It could be argued the single member end cap system introduced here may not be useful in the case that the existing cables need to be changed or additional cables need to be installed. However, it is believed that as far as our single member end cap is designed to have multi-entry cable ports providing for such changes, this argument is no longer serious.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cable splice closure assembly which comprises:
   an end cap body as a unitary construction having a plurality of cable passage holes therein for the passage of a cable therethrough, each of said passage holes having a seal zone for retaining a sealing material and a thread zone, wherein washers are coaxially disposed around the cable and provided at both ends of the sealing material within the seal zone, and
   a screw plug having a cable passage hole therein for the passage of said cable therethrough, said screw plug being adapted for mating engagement with said thread zone of said cable passage holes of said end cap body, whereby upon tightening of the screw plug, the sealing material is compressed to seal said cable within the seal zone.

2. The cable splice closure assembly of claim 1, wherein when said screw plug is in mating engagement with the thread zone of each of said passage holes, the cable passage holes of said end cap body and said screw plug are in alignment for receiving said cable therein.

3. A cable enclosure assembly composite which comprises:
   an end cap body as a unitary construction having a plurality of cable passage holes therein for the passage of a cable therethrough, each of said passage holes having a seal zone for retaining a sealing material and a thread zone, wherein washers are coaxially disposed around the cable and provided at both ends of the sealing material within the seal zone, a screw plug having a cable passage hole therein, said screw plug engaging said thread zone such that the cable passage holes of the end cap body and the screw plug are in alignment, said cable disposed within said cable passage holes and extending through said screw plug and said end cap body, and said sealing material disposed in said seal zone whereby upon the tightening of the screw plug, the sealing material is compressed to seal said cable within the assembly composite.

4. The cable and enclosure assembly composite of claim 3, wherein the sealing material is coaxially disposed around the cable.

5. A method of assembling a cable enclosure assembly composite which comprises:

providing an end cap body having a plurality of cable passage holes therein, each of said passage holes defining a seal zone and a thread zone and said end cap also providing a screw plug having a cable passage hole therein, inserting a spliced cable into the cable passage hole of the screw plug, positioning two washers on the cable outside the cable passage holes of the end cap body, wrapping a sealing material around the cable between the washers, inserting the cable wrapped with the sealing material and containing the washers into the seal zone of one of the passage holes of the end cap body, and fastening the screw plug in the thread zone whereby the sealing material is compressed to seal said cable within the seal zone.

* * * * *